UNITED STATES PATENT OFFICE.

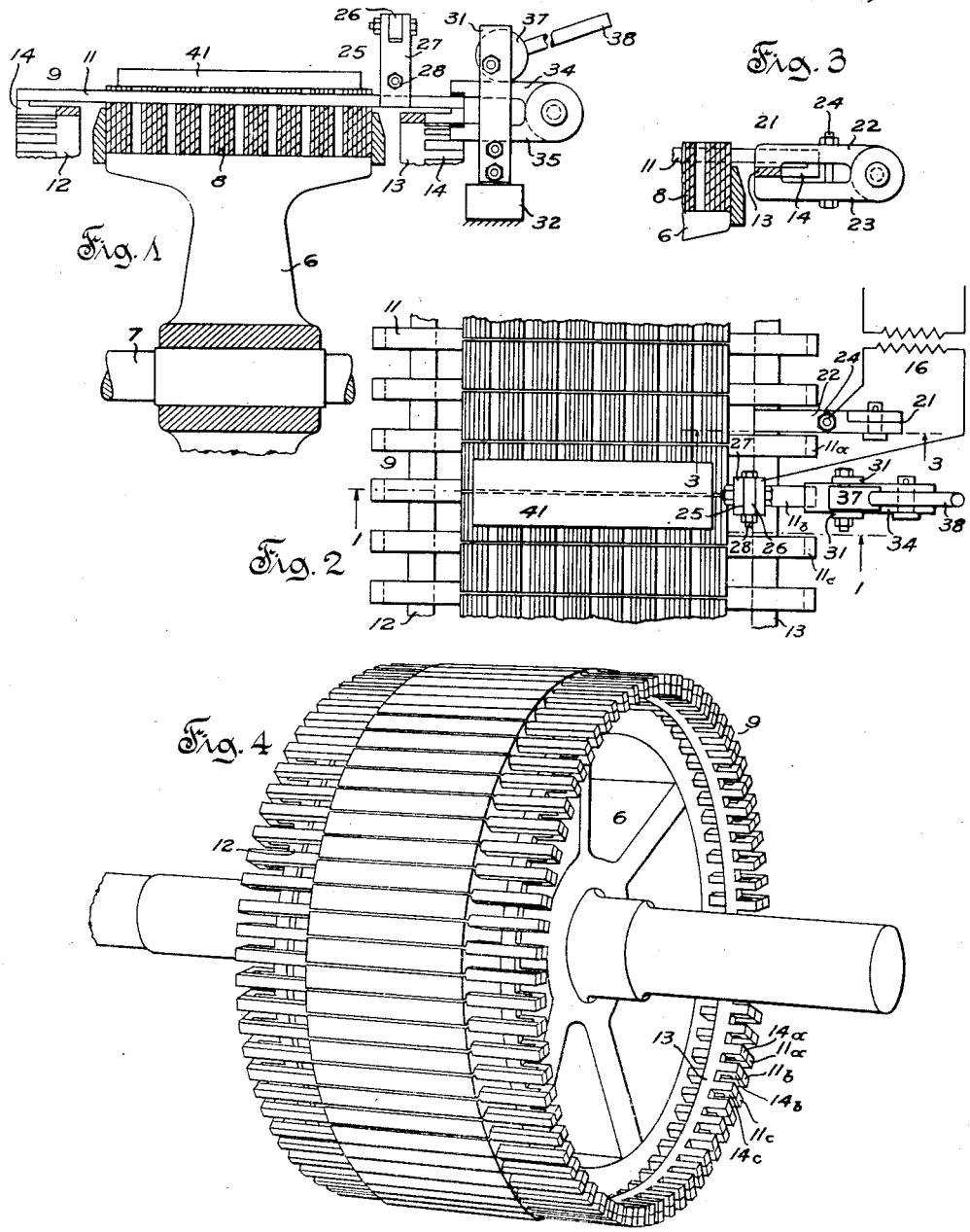

NATHAN WILKINSON, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

SQUIRREL-CAGE WINDING CONSTRUCTION.

1,351,270.   Specification of Letters Patent.   Patented Aug. 31, 1920.

Application filed August 27, 1914. Serial No. 859,121.

*To all whom it may concern:*

Be it known that I, NATHAN WILKINSON, a citizen of the United States, residing at Milwaukee, in the county of Milwaukee and State of Wisconsin, have invented a certain new and useful Improvement in Squirrel-Cage Winding Construction, of which the following is a specification.

This invention relates in general to structures constituted, at least, in part, of an element of electrically conductive material of comparatively poor magnetic qualities and comprising portions autogenously united or welded together, the welded portions being electrically connected through means other than the welded surfaces of the portions, and the method of and apparatus for assembling such structures; and has particular relation to electrical apparatus having windings of the squirrel cage type, in which conducting bars disposed in inductive relation to a core are welded at their ends to end connecting members, and to the method of assembling such apparatus.

Previous to this time, the conducting bars of windings of the squirrel cage type have been secured to end connecting members by screwing, riveting, soldering or brazing, or by casting the end member integral with the bars, or by such a welding operation between the individual bars and the end members as requires the presence of a third piece, this piece being welded to both the bar and the end member, or a projection therefrom. Screwing, riveting, soldering and brazing, as ordinarily practised, are open to mechanical objections in that the union of the parts is not such as sufficiently insures against the connections working loose after a comparatively brief period of operation. Casting of the conductor bars to the end member is open to the objection that such an operation involves the comparatively expensive operation of building a mold about the core with the bars in place therein, and, further, that, unless the bars are unnecessarily long, the intense heat developed quite close to the core, i. e., immediately adjacent the inner edge of the cast end member, is very liable to injure the insulation about the bars in the core. A welded construction of the squirrel cage winding, embodying a third piece which is welded to a conducting bar and the end member, or a projection therefrom, involves the extra cost of the copper of the third pieces, and, further, the use of a high amperage current for developing sufficient heat to electrically weld the third piece to both a conductor bar and the end member at the same time, the area of this weld being at least twice the cross-sectional area of the conductor bar.

Prior to this invention, it was considered impossible to apply the simplest form of welding, that is, a direct union of the conducting bars to the connecting members, or extensions therefrom. A welded connection between the highly conductive bars and the end connecting members, or projections therefrom, produced by the use of a flame has been found to be impracticable. This results from the fact that, as the heat is applied to the parts to be welded wholly externally thereof, the external portions of these parts are brought to a welding temperature and beyond this point before the interior parts to be welded can be sufficiently heated, resulting in a union between the two parts wherein the parts, if really welded at all, are welded only along the edge of the contact surfaces, the interior portions of these surfaces being unwelded; and, in any case, the exterior of the parts to be welded are quite liable to be burned away or considerably distorted. Again, where the parts to be welded directly are of copper or other highly conductive material, it is difficult to so localize the effect of the heating flame as to prevent portions of the parts to be welded, other than the welding surfaces, from being so melted and softened as to become distorted through their own weight alone. Direct welding of these parts by the use of electric current of sufficiently high amperage to produce a welding heat throughout the entire area to be welded, has been found impossible, the reason being that sufficient current does not flow across the joint between the end of the bar and the end connecting member to be welded thereto, if the end connecting member is already welded, or otherwise electrically connected, to one or more bars which are also welded, or otherwise electrically connected, to a second end connecting member to which the bar to be welded is similarly secured. With this condition present, one or more shunt paths are established about the joint to be made, these shunt paths comprising the end member to be welded, the bar or bars secured thereto, the second end connecting member connected to these bars, and the opposite end of the conductor to be welded. In view of the fact that these shunts comprise paths of high electrical conductivity, it will be apparent that such a considerable portion of the current passes therethrough as precludes the possibility of obtaining sufficient current across the joint to be welded to bring the parts of the same to a welding temperature without destructive heating of parts of the structure.

It is an object of this invention to provide an improved structure comprising a plurality of spaced bars of highly conductive material autogenously united or welded to end connecting members by direct union of the metal of the parts.

It is a further object of this invention to provide an improved construction applicable to dynamo-electric machines and comprising a plurality of conductor bars disposed in inductive relation to a core of magnetic material and welded to end connecting members by direct union of the metal of the parts.

It is a further object of this invention to provide an improved method of welding a plurality of spaced electrically conductive elements to a plurality of other spaced electrically conductive connecting elements, and an apparatus for practising such method.

It is a further object of this invention to provide an improved method of welding end connecting members to opposite ends of conductor bars inductively associated with a core of magnetic material, and an apparatus for practising such method.

These and other objects, such as are included in the scope of the appended claims, are attained by this invention, the various novel features of which will appear from the description and drawings, disclosing one embodiment of such invention, and will be particularly pointed out in the claims.

In the accompanying drawings:

Figure 1 is a broken vertical section through the rotor of a squirrel-cage induction motor embodying this invention, showing details of apparatus used in assembling the complete rotor, the section being taken on the plane of the line 1—1 of Fig. 2.

Fig. 2 is a broken developed plan view of the rotor shown in part in Fig. 1, showing details of apparatus used in assembling the rotor.

Fig. 3 is a broken vertical section in the plane of the line 3—3 of Fig. 2.

Fig. 4 is a perspective view of a complete induction motor rotor of the squirrel-cage type, embodying this invention.

In the drawings, wherein features of the invention are shown as applied to induction motor construction, a rotor 6, of the squirrel-cage type is mounted on a shaft 7. The rotor 6 comprises a core 8, preferably of laminated material, and a squirrel-cage winding 9, the latter comprising conductor bars 11, in slots of the core, and end connecting rings 12 and 13, having extensions 14 connected to the ends of the bars.

The connection between the extensions 14 of one end ring, say the ring 12, and the bars 11, may be a welded one. This end ring 12 can be welded to the conductor bars 11 without much difficulty, by the use of an apparatus similar to that shown in Figs. 1, 2 and 3. The problem is merely one of passing sufficient current through the joint to be welded to heat the parts thereof, across the full area of the surfaces to be welded, to a welding temperature, at which time pressure applied to these parts will force the same into intimate union. The individual bars are welded separately to the corresponding projections 14 on the end connecting ring 12.

This apparatus, as shown, comprises a source of current 16, here shown as the secondary of a transformer, and welding terminals connected thereto, the terminal 21 being for the purpose of connecting the end ring to one side of the source 16 and comprising pivoted jaw members 22 and 23 and an adjustable bolt 24 for causing a portion of the ring to be gripped and held in good electrical engagement with the oppositely disposed jaw members. This bolt 24 may also serve to bind a supply terminal to the welding terminal 21. The terminal 25 comprises pivoted jaw members 26 and 27 and an adjustable bolt 28 for forcing these jaw members into contact and good electrical engagement with the radial sides of the end of a conductor bar 11. A supply terminal may be connected to this welding terminal 25 in any suitable manner. These terminals 21 and 25 should present sufficient contact surface for engagement with the end ring and bar to be welded to prevent any considerable heating and to maintain the resistance of the welding circuit at a minimum. Parallel members 31 are held in spaced relation and are fixed in position, as by being secured to a fixed support 32. Pivoted jaw members 34 and 35 pass between the members 31 and extend into such position that the end of the member 34 lies over the end of the bar to be welded, and the end of the member 35 lies beneath the corresponding extension 14 of the end ring. A cam member 37 is pivoted between the members 31 and is provided with an operating handle 38, and serves to force the member 34 to approach the member 35, the latter being held, and to thus squeeze the end of the conductor bar and the end ring extension to be welded into intimate contact, this cam being operated to produce such effect when the welding current has brought the parts to be welded to a welding heat.

The operation of welding one end ring, such as 12, to corresponding ends of bars 11, is not difficult. Considering the ring 12 as completely welded to the adjacent ends of the conductor bars, and that the parts are now in position to weld one bar, such as 11$^a$, to an extension 14$^a$ on the ring 13, then, this latter welding operation is similar to that described in connection with the welding of the ring 12 to the opposite end of the bar 11$^a$. When, however, the bar 11$^a$ is welded to the ring extension 14$^a$, the other end of this bar being already welded to the ring 12, and it is attempted to weld another bar, such as 11$^b$, to its corresponding ring projection 14$^b$, by the same welding process, the total current flowing between the terminals 21 and 25 divides into two paths, one portion of the current flowing across the engaging surfaces of the parts to be welded, 14$^b$ and 11$^b$, and another portion of the current flowing through the ring projection 14$^a$, bar 11$^a$, ring 12 and back through the bar 11$^b$ to the terminal 25. It will be apparent that it is quite impossible to pass sufficient current across the portion of the bar 11$^b$ and the end ring projection 14$^b$ to be welded thereto, or, at least, only at the expense of dangerously heating the bar 11$^a$ and the body portion of the bar 11$^b$. It will be obvious then, that, even were it possible to weld the bar 11$^b$ to the ring projection 14$^b$, nevertheless, when it is attempted to weld another bar, such as 11$^c$, and the corresponding ring projection 14$^c$, the difficulties are greatly increased, since there are now two shunt paths about the engaging surfaces of the parts to be welded, and, hence, it is practically impossible to secure enough current to heat the parts to be welded to a welding temperature. As can be readily seen, the number of shunt paths about the parts to be welded, and, hence, the difficulties of welding are increased as the number of bars in electrical engagement with the end ring to be welded, increases.

In accordance with this invention, means are provided for choking or opposing the flow of any current through the bar to be welded, other than that current which is useful to produce welding heat in the parts to be welded; in other words, the current which, under normal conditions, would flow through the bar to be welded, in shunt to the path of the welding current, is so reduced as to be negligible. As shown in the drawings, an alternating current source may be used for the welding operation, and suitable means may be provided for choking off or opposing any undesirable flow of current in the bar or member to be welded, this means being here shown as a closed magnetic circuit established about the bar to be welded, and of sufficient intensity to effectively choke off any current other than the welding current. When the article to be welded is, as shown in the drawings, a squirrel-cage winding of an induction motor, a piece of iron, or other highly magnetic material 41, is used, this member bridging the core slot occupied by the conductor bar to be welded to the end ring. The effect of this member 41 is to establish a closed magnetic circuit about the bar to be welded, which exercises the effect of opposing or choking the flow of alternating current therein, this effect being similar to the insertion, in the circuit of the body portion of the bar, of a source of opposing electromotive force. This opposing or reactive effect may be such as cuts down the useless current flowing in the bar to be welded, to a negligible amount. It will be obvious that where a positive electromotive force is induced by establishing such an intense magnetic field about the conductor bar being welded as to generate therein a current flowing in the opposite direction, no portion of the current from the welding terminals will pass through the conductor bar at any point other than the portion to be welded.

In the case of induction motor rotors, where the conductor bars are disposed in slots, the greater part of the required magnetic circuit is already present in the iron of the core and the addition of only sufficient magnetic material, bridging the slot, as forms a closed magnetic path of the required dimensions, reduces the current flowing in the bar to a negligible amount, this magnetic bridge developing such a reactance as prevents the flow of any appreciable amount of welding current in the conductor bar to be welded. It will be obvious that the successive conductor bars may be welded by moving the magnetic bridge 41 so that, during each welding operation, the member 41 occupies such a position as to effectively bridge the slot of the conductor bar being welded.

It will be apparent that when the article to be welded is not already provided with magnetic material as a part of its structure, means forming a closed or partly closed magnetic path of the required dimensions may be placed about the conducting element to be welded at such a point as will effect a reduction of or choke the passage of current in such element, other than the current that is useful for heating the portions to be welded.

It will also be apparent that the impedance developed by the closed magnetic path may be materially increased by increasing the frequency of the alternating welding current.

It will be obvious that, in accordance with this invention, the conducting members can be cohesively or autogenously united, as by welding the same together directly, i. e., without the use of a connecting member welded to both of the conducting members to be joined, and that this weld, in order to be an efficient one, both mechanically and electrically, need be of no greater cross-sectional area than the cross-sectional area of the welded surface of the smaller one of the welded parts.

For the sake of brevity the phrase " of the type of copper " is used in certain of the claims and is intended to define any of the metals, of which copper is a typical instance, which cannot be welded by the ordinary and well known heat processes but which are weldable by means of electricity.

It should be understood that it is not desired to be limited to the exact details of construction shown and described, or to the exact details of the method disclosed, for obvious modifications will occur to a person skilled in the art.

It is claimed and desired to secure by Letters Patent:—

1. As an article of manufacture, a cage-like device including a plurality of metallic bars of the type of copper and a pair of metallic rings of the type of copper directly united to said bars by welds extending throughout the full cross section of the united parts.

2. In a squirrel-cage rotor, a core of magnetic material having slots, conductor bars disposed in said slots, and end rings, one at each side of said core, directly united to said bars by welds extending throughout the full cross section of the united parts.

3. In a dynamo-electric machine, a core of magnetic material provided with slots, conductor bars disposed in said slots and extending beyond the ends of said core, and end rings one on each side of said core, one of said end rings having projections corresponding to each of said conductor bars, the projections of said end ring being directly united to said bars by welds.

4. In a dynamo-electric machine, a short circuited winding comprising conductor bars, and an end ring comprising a body portion spaced from said bars, and spaced projections from said body portion coöperating with said bars, said projections being directly united to said bars by welds extending throughout the full cross-section of the united parts.

5. In a dynamo-electric machine, a short-circuited winding comprising conductor bars, an end ring radially within said bars and having its body portion spaced from said bars, said end ring being provided with axially extending projections spaced from said conductor bars, said projections having radial extensions of substantially the same cross-sectional area as the end portions of said bars and autogenously united therewith.

6. In a dynamo-electric machine, a short-circuited winding comprising conductor bars, an end ring radially within said bars and having its body portion spaced from said bars, said end ring being provided with axially extending projections in substantially radial alinement with said conductor bars, one set of said parts being provided with radial extensions directly and cohesively united to the other set of parts.

7. In a squirrel-cage rotor, a core of magnetic material having slots, conductor bars disposed in said slots, and end rings, one at each side of said core, said end rings having spaced projections extending substantially parallel to the conductor bars, and a plurality of welds, one weld for uniting one each of said conductor bars to one of said projections, the locus of the welds associated with the projections of a given end ring being substantially a cylinder coaxial with the bars and said end ring.

8. In a squirrel-cage rotor, a core of magnetic material having slots, conductor bars disposed in said slots, and end rings, one at each side of said core, said end rings having spaced projections extending substantially parallel to the conductor bars, and a plurality of welds, one weld for uniting one each of said conductor bars to one of said projections, the plane of each weld being substantially at right angles to the general plane of its associated projection and bar and substantially parallel to the axis of the bar.

9. As an article of manufacture, a cage-like device including a plurality of metallic bars, a pair of end rings, disposed at the respective ends of said bars, each of said end rings comprising a body portion spaced from said bars and a plurality of projections spaced from and extending substantially parallel to said bars, and a plurality of welds uniting said bars at their respective ends to said projections, there being a single weld between each end and its associated projection, the plane of said weld being substantially at right angles to the general plane of its associated projection and bar and substantially parallel to the axis of the bar.

10. In a dynamo-electric machine, a short circuited winding comprising a set of conductor bars, an end ring having a body portion spaced from said bars, said end ring being provided with a set of projections, one of said sets being provided with off-set portions directly united to the other set by welds extending throughout the full cross-section of the united parts.

In testimony whereof the signature of the inventor is affixed hereto in the presence of two witnesses.

N. WILKINSON.

Witnesses:
W. H. LIEBER,
G. F. DE WEIN.